United States Patent [19]

Slavens et al.

[11] 4,293,758

[45] Oct. 6, 1981

[54] WELDING APPARATUS INCLUDING MEANS FOR DEPOSITING THE WELD METAL ALONG PARALLEL PATHS

[75] Inventors: Clyde M. Slavens; Edward A. Clavin; James E. Alleman, all of Houston, Tex.

[73] Assignee: Midcon Pipeline Equipment Co., Houston, Tex.

[21] Appl. No.: 62,686

[22] Filed: Aug. 1, 1979

[51] Int. Cl.³ .............................................. B23K 9/09
[52] U.S. Cl. ........................... 219/125.12; 219/130.51
[58] Field of Search ...................... 219/125.12, 130.51, 219/124.1

[56] References Cited

U.S. PATENT DOCUMENTS

| | | | |
|---|---|---|---|
| 3,818,176 | 6/1974 | Brown | 219/125.12 |
| 3,832,522 | 8/1974 | Arikawa et al. | 219/125.12 |
| 3,956,610 | 5/1976 | Kanbe et al. | 219/130.51 |
| 4,177,373 | 12/1979 | Roen | 219/125.12 |

Primary Examiner—C. C. Shaw
Attorney, Agent, or Firm—Carl B. Fox, Jr.

[57] ABSTRACT

Improved methods and apparatus for welding, wherein during welding the welding electrode is oscillated laterally of the weld path, and the welding current pulse frequency and oscillation frequency are correlated whereby weld metal droplets are deposited when the electrode is at its limit of movement away from center at each side of the weld path. During each cycle of oscillation of the welding electrode, a controlled number of weld metal droplets is deposited at each side of the weld path. An electrical circuit controls the electrode oscillation frequency and the welding current pulse frequency to be in correlation, and controls the number of weld metal droplets deposited at the opposite sides of the weld during each oscillation of the welding electrode.

34 Claims, 9 Drawing Figures

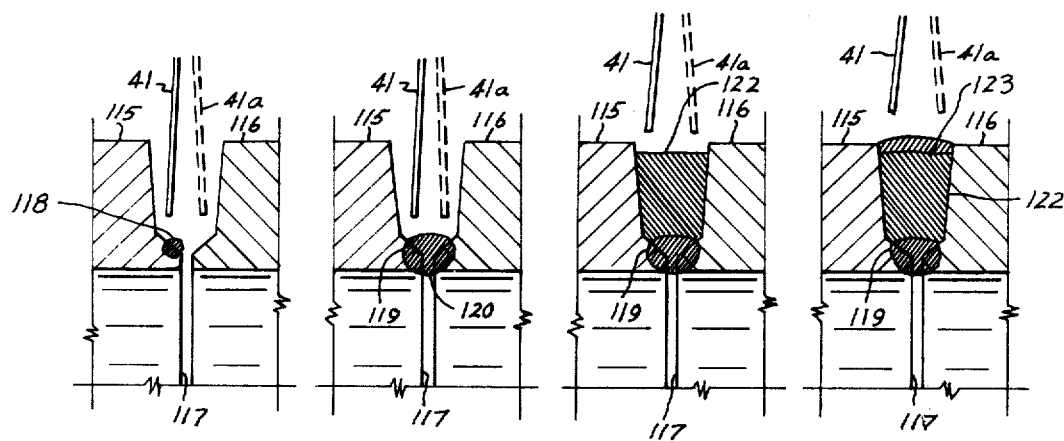
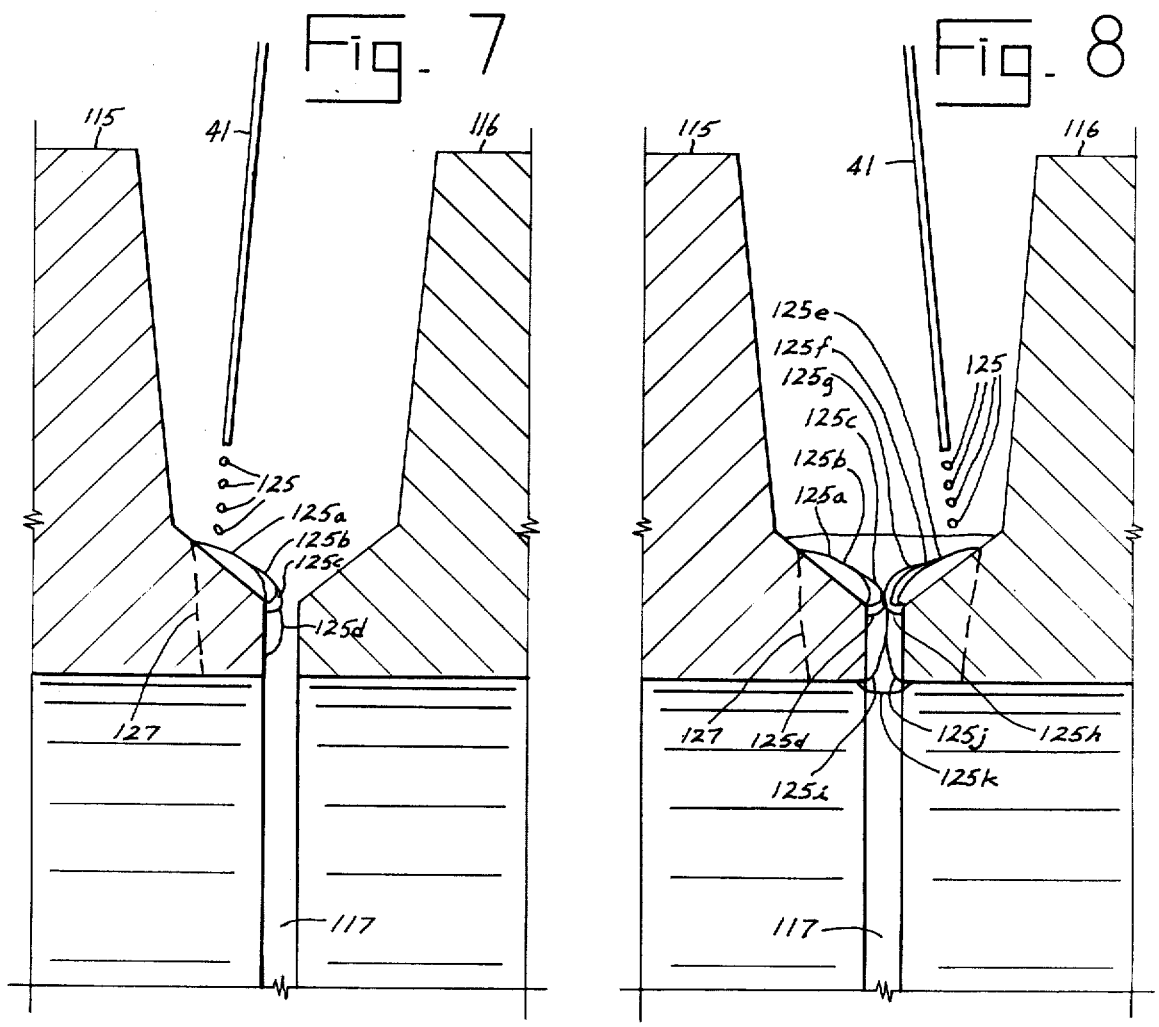

WELDING APPARATUS INCLUDING MEANS FOR DEPOSITING THE WELD METAL ALONG PARALLEL PATHS

BACKGROUND OF THE INVENTION

In the welding of metal objects together, especially when an intentional gap is provided between the objects to be welded together to enable penetration of the weld completely through the depth of the object, a considerable amount of weld metal passes completely through the gap between the objects, this being known as "blow through". Not only is weld metal wasted because of blow through, but the weld is rendered unattractive and rough because of formation of "cat's whiskers" of weld metal at the backside of the weld, and other weld deformations. In the case of pipe sections welded together end-to-end, such roughness and irregularity of the weld at the inside of the pipes causes flow and corrosion problems which cannot be tolerated. Grinding or other finishing operations at the inner side of the weld must be performed before the pipeline can satisfactorily be used to convey petroleum products.

To improve the qualities of such welds in pipelines, and to avoid the cost and trouble of finishing operations, this invention provides methods and apparatus whereby welds can be formed which are of improved appearance and smoothness at the backsides of the welds.

SUMMARY OF THE INVENTION

According to the invention, welding methods and apparatus are provided wherein the tip of the welding electrode is moved or oscillated back and forth across the path of the weld in timed relationship with the welding current frequency, so that droplets of weld metal are discharged from the welding tip at the sides of the weld path, with little or none of the weld metal being discharged from the welding tip at the location of the weld joint, or at the location of the gap if a gap is provided at the weld joint. In this manner, welds are made in which formation of "cat's whiskers" and other weld irregularities at the inner or backside of the weld are minimized or eliminated entirely.

Welding apparatuses are known in which the welding tip is moved back and forth across the weld path, i.e. the welding tip is oscillated or vibrated crossways of the weld path. Examples of such apparatuses are shown in U.S. Pat. Nos. 2,093,881, 3,922,517, 1,956,406, 3,619,552, 2,405,761, 3,396,263, 3,328,556, 1,933,340, 2,280,770, 3,963,895, Russia Pat. No. 253,974, and Japan Pat. No. 47-1082. None of the apparatuses or methods disclosed in these patents teaches the use of a timed relationship between back and forth welding electrode movements and the rate of discharge of weld metal droplets from the welding electrodes.

The apparatus disclosed uses a consummable electrode, but the invention may be adapted to welding apparatuses using a stationary electrode.

A principal object of the invention is to provide methods and apparatuses for welding wherein weld metal is discharged from a welding tip in timed relationship with oscillations of the welding tip. Another object of the invention is to provide such methods and apparatuses wherein the weld metal discharges occur when the welding tip is at the ends of its crossways movements or oscillations. A further object of the invention is to provide such methods and apparatuses wherein the number of discharges of weld metal at each side of the weld path can be controlled. Yet another object of the invention is to provide such methods and apparatuses wherein discharge of different numbers of weld metal droplets at opposite sides of the weld path can be achieved. Another object of the invention is to provide such methods and apparatuses which are economical and relatively simple in use, and which produce strong dependable welds of improved appearance and quality.

Other objects and advantages of the invention will appear from the following detailed descriptions of preferred embodiments, reference being made to the accompanying drawings.

BRIEF DESCRIPTIONS OF THE DRAWINGS

FIGS. 3–6 are schematic views illustrating the preferred methods according to the invention.

FIGS. 7–8 are enlarged schematic views further illustrating the methods of the invention.

DESCRIPTIONS OF THE PREFERRED EMBODIMENTS

Figure 1:
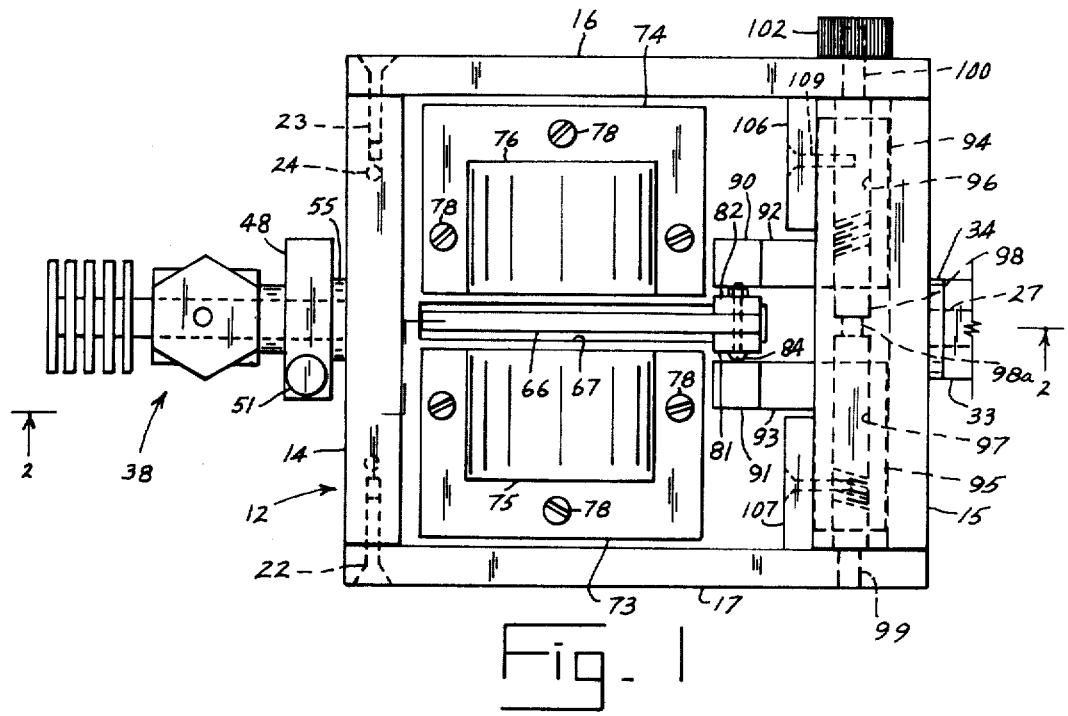
FIG. 1 is an upper plan view of a preferred form of apparatus according to the invention, the top plate or cover of the apparatus being removed.
Figure 2:
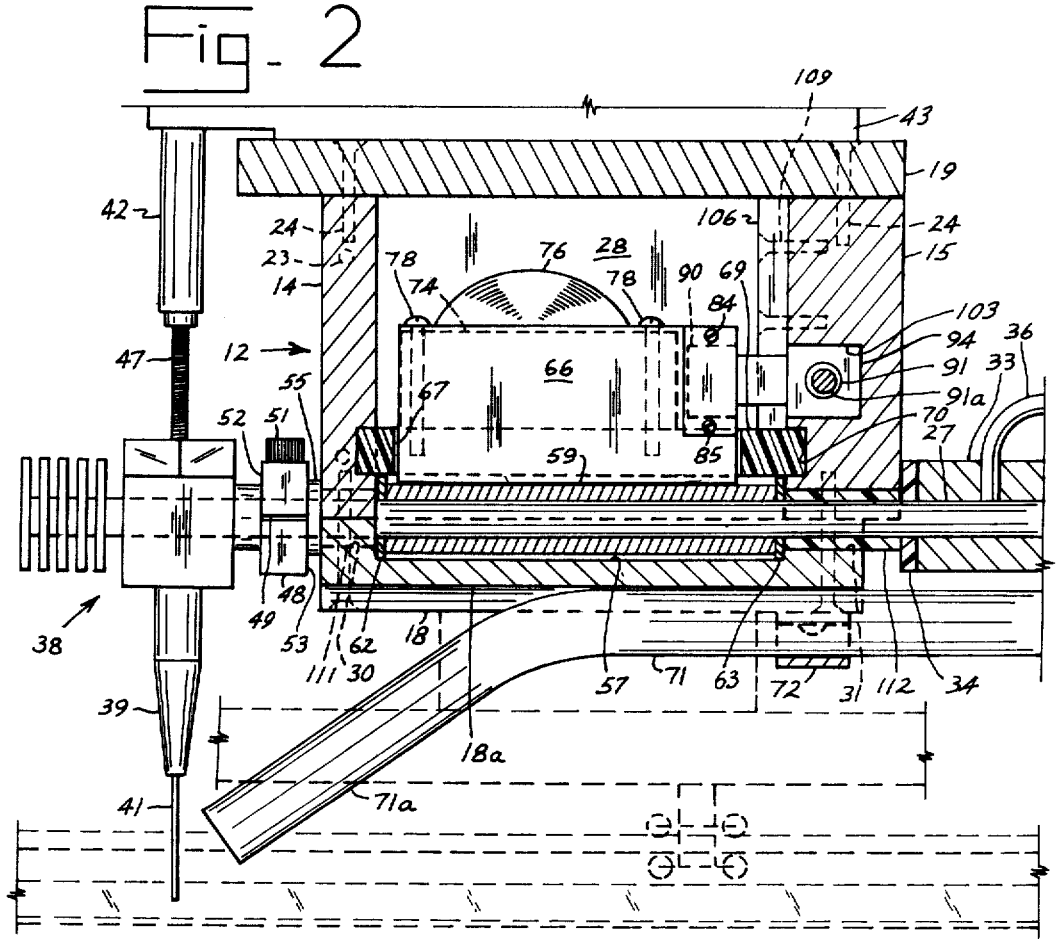
FIG. 2 is a vertical cross section taken at line 2—2 of FIG. 1.

Referring now to the drawings in detail, and first to FIGS. 1 and 2, a main housing 12 for the apparatus is made up of plates 14–17, and a bottom plate 18, and a top plate or cover 19. These plate elements are held together by screws, not all of the screws being shown in the drawings. For example, an edge of plate 17 is connected to plate 14 by upper and lower screws 22, and an edge of plate 16 is connected to plate 14 by upper and lower screws 23. Each screw is received in a counterbored recess to receive the screw head, and the screws are received in tapped openings in plate 14. Similarly, cover 19 is connected to plates 14–17 by a plurality of screws 24, the screws being spaced around the edges of cover 19 and screwed into tapped openings in plates 14–17.

An electrical conductor tube 27 extends through the bottom portion of the interior 28 of housing 12. The tube is disposed through a cylindrical opening 30 formed at the juncture between plate 14 and bottom plate 18. Tube 27 is similarly disposed through an opening 31 formed at the juncture between plate 15 and bottom plate 18. Insulating sleeves 111, 112 surround tube 27 at openings 30, 31, respectively. Each opening 30, 31 is formed half in each plate member at the junctures, tube 27 being rotative in openings 30, 31. A fitting 33 is connected to tube 27 at its righthand end, as shown in FIGS. 1 and 2, a washer 34 being disposed between fitting 33 and plate 15. Fitting 33 connects a conductor cable 36 to tube 27, electric welding current being supplied to tube 27 through conductor cable 36. At its lefthand end, as shown in FIGS. 1 and 2, tube 27 has connected thereto a welding torch 38. Torch 38 has tip element 39 through which a consummable welding electrode 41 extends. The welding electrode, in the form of a continuous wire, is fed to the torch through tube 42 of electrode wire feeder 43 which is affixed to the upper side of plate 19. Any suitable form of wire feeder 43 may be used. The wire passes from tube 42 through flexible conduit 47 connected between tube 42 and torch 38. The torch is affixed to tube 27 by clamp, the clamp having a slit 49 at one side across which screw 51 extends, the screw passing through an unthreaded passage through clamp portion 52 above slit 49 and through a tapped opening through portion 53 of clamp 48 below slit 49. Insulating washer 55 is disposed between clamp 48 and plate 14.

Bottom plate 18 is interiorly recessed at 57, the recess 57 forming a part of interior chamber 28 of housing 12. A steel tube 59 is fixed to tube 27 within chamber 28, washers 62, 63 being provided at the opposite ends of tube or sleeve 59. Sleeve 59 rotates with tube 27 when the latter is rotated. An upstanding rectangular plate 66 is welded along its lower edge to the upper side of sleeve 59. Plate 66 is disposed through a slot opening 67 of an insulating plate 69 which is fixed in slots 70 extending around the interiors of plates 14–17. Insulating plate 69 is formed of an insulating material. The insulating material known as "LEXAN" is suitable for this purpose.

Bottom plate 18 has a longitudinal recess 18a within which is disposed a tube 71 adjustably fixed in place by bracket 72 screwed to the underside of plate 18 by screws, as shown. The end of tube 71 is bent downwardly as at 71a to be directed toward the tip of electrode 41. The other end of tube 71 may be connected to a source, not shown, of a shielding gas containing carbon dioxide, argon, and the like, to exclude atmospheric oxygen from the weld, as is well known in the art.

A pair of electromagnets 73, 74 having coils 75, 76, respectively, are disposed at opposite sides of plate 66, connected to insulating plate 69 by plural screws 78.

Plate 66 has insulating pads or plates 81, 82 affixed vertically thereto at opposite sides of its righthand end, as shown in FIGS. 1 and 2, by bolts 84, 85 which pass through plate 66, as shown. The bolts are above end below the upper and lower ends of stops 90, 91 carried respectively by arms 92, 93, arm 92 depending from the inner end of slide member 94 and arm 93 depending from the inner end of an opposite slide member 95. Slide member 94 has a longitudinal passage 96 therethrough, which is threaded, and slide member 95 has a longitudinal passage 97 therethrough, also threaded. The threads of passages 96, 97 are of opposite pitch. A shaft 98 is reduced in diameter at its center portion 98a. Reduced end 99 of shaft 90 is journaled for rotation in a hole through plate 17. Reduced end 100 of shaft is journaled for rotation through an opening through plate 16, and extends outwardly of the plate to be connected to knob 102. Slide elements 94, 95 are slidably disposed in a rectilinear recess 103 in the inner face of plate 15. The slide elements extend from the bottom of the recess to be flush with the inner face of plate 15. Retainer plates 106, 107 are each connected to the inner face of plate 15 by plural screws 109. Plates 106, 107 retain the slide elements 94, 95 within recess 103. When knob 102 is rotated to rotate shaft 98, the oppositely pitched threads at the opposite ends of shaft 98 move the slide members 94, 95 and the stops 90, 91 in opposite directions, either toward one another or away from one another.

Plate 66 is moved in oscillatory motion by successive energizations of coils 75, 76 of electromagnets 73, 74. When coil 75 is energized, plate 66 is magnetically pivotally moved toward coil 75. When coil 76 is energized, plate 66 is magnetically pivotally moved toward coil 76. Therefore, the alternate successive energizations of the coils cause plate 66 to be oscillated back and forth between the coils. The amplitude of the oscillations is controlled by the positions of stops 90, 91. When stops 90, 91 are moved farther apart by appropriate rotation of knob 102, the amplitude is larger, and when stops 90, 91 are moved closer together by appropriate opposite rotation of knob 102, the amplitude is smaller.

Welding torch 38 oscillates about the axis of tube 27, which is oscillated rotatively by oscillation of pipe 66. Sleeve 59, being fixed to plate 66 and to tube 27, transmits the oscillations of plate 66 to tube 27. Control of the oscillation amplitude of plate 66 therefor also controls the oscillation amplitude of the tip of torch 38. Tube 42 does not oscillate with the torch, flexible conduit 47 permitting torch oscillation without strain to the apparatus.

It should be noted that the amplitude range of oscillation of plate 66 may be altered by altering the thicknesses of pads 81, 82. Pads 81, 82 are formed of insulating material, such as "LEXAN", to prevent passage of electrical voltage and current from plate 66 to slide members 94, 95 and housing 12. For the same purpose, tube 27 has the insulating sleeves 111, 112 therearound where tube 27 passes through the junctures between plates 14, 15 and bottom plate 18.

Referring now to FIGS. 3-6 of the drawings, the welding electrode 41 is shown in each drawing figure in a solid line position 41 and a dashed line position 41a. These positions represent the two positions of farthest movement of the electrode to and fro during oscillation. A pipe end 115 is aligned with and spaced from a second pipe 116 by gap 117. Each pipe end is beveled as shown to provide that the weld formed in the gap may penetrate to the interiors of the pipes. By means of an electrical circuit to be described, the deposition of weld metal droplets or globules is controlled so that a droplet is discharged from the electrode only when the electrode is at the limit of its oscillatory motion in each direction. In other words, one or more weld metal droplets are discharged when the electrode is in position 41, and one or more weld metal droplets are discharged when the electrode is in position 41a, for each angle of oscillation. During movement of the electrode between positions 41, 41a in each direction, no weld metal droplets are discharged from the electrode tip. During oscillation of the electrode, a single droplet may be discharged at the end of each oscillatory movement, or, the electrode may be retained at either or both sides so that plural droplets of electrode metal may be discharged before the electrode moves to the opposite side of the gap. The electrode does not contact either of the pipes 115, 116 during its oscillatory movements, the amplitude of oscillation being controlled such that the oscillation amplitude is less than the width of the gap.

The tip 41 may additionally be controlled such that a pool 118 of weld metal may be built up at one side of the gap as welding is commenced in order that a sufficiently high temperature may be created to initiate the weld. Thereafter, the tip oscillates at a pre-set rate with one or more droplets being discharged at the end of each oscillatory movement of the tip until the weld is completed. It will be realized, of course, that the welding torch apparatus is moved along the length of the gap 117 during welding, this usually being accomplished by support of the welding torch apparatus on a carriage which moves about the pipes as the weld is made.

FIG. 4 illustrates a completed root weld 119. The weld metal deposited along parallel paths at the opposite sides of the gap 117 flows together along the center of the weld to form a unitary weld bridging the gap. Penetration caused by fusing of an inner portion of each of the pipe walls causes the weld to have a humped cross section at 120. However, since weld metal droplets are not discharged at the center of the gap, blow through of weld metal through the gap and formation of "cat's whiskers" and other undesirable weld configurations does not occur. No finishing operation, such as grinding or chipping of the weld at the interior of the pipes must be performed, since the weld as made is smooth, uniform, configuration.

Referring now particularly to FIG. 5, after root weld 119 has been completed, a filler weld 122 is formed over the root weld to fill the major portion of the gap. The welding torch is moved away from the gap as the filler weld is made. Upon completion of the filler weld, a cap or finish weld 123 is formed, filling the gap and providing a slightly humped formation at the exterior of the weld. The torch may be moved farther from the pipes during formation of the cap weld.

FIGS. 7 and 8 further illustrate the formation of welds according to the invention. Electrode 41, FIG. 7, is shown to discharge four weld metal droplets 125 at the end of each oscillatory motion toward the left. The weld is built up to forms 125, 125a, 125b, 125c, 125d as weld metal is deposited in a single pass at the left side of the weld, as shown in FIG. 7. Similarly, the weld is built up by droplets 125 in forms 125e through 125k in said single pass at the right side of the weld. Fusion of the pipe metal at opposite sides of the gap occurs, for example, to the limits 127, 128 at each side of the weld, those lines not being in exact locations but being provided only to illustrate that fusion of the pipe ends occurs at each side of the weld. The weld metal deposited in the parallel paths at the opposite sides of the gap flows together to form an integral weld across the gap joining the pipe ends together.

Figure 9:
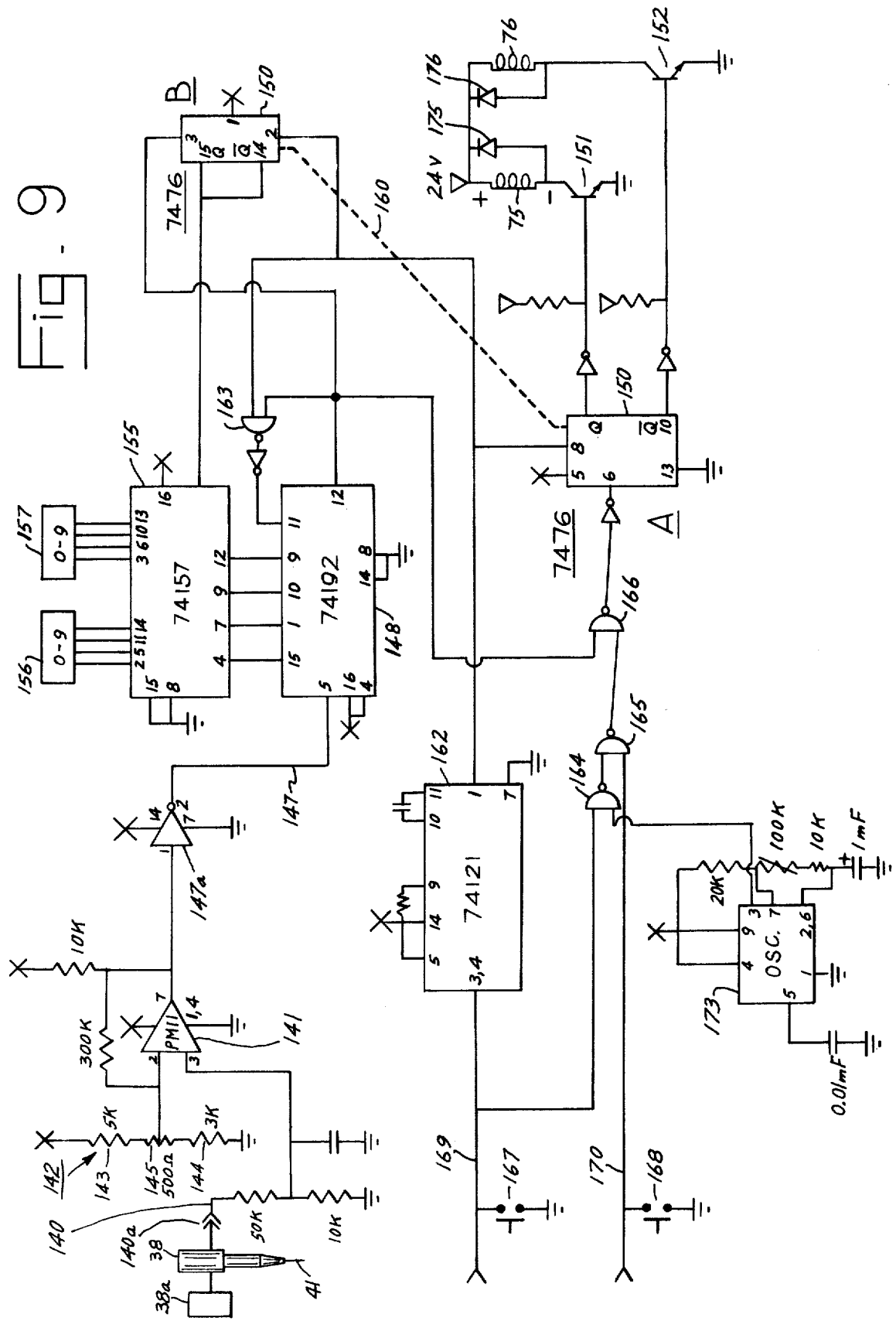
FIG. 9 is a circuit diagram employed in the preferred form of apparatus according to the invention and utilized in performance of the methods.

Referring now to FIG. 9 of the drawings, an electrical control circuit is shown which correlates the oscillations of torch 38 and electrode 41 with the welding current pulses, so that the pulses will coincide with the electrode oscillations to discharge weld metal droplets (one or more) at the end of each oscillation stroke or movement. The welding current voltage from input 140 is delivered to voltage comparator 141, input 140 receiving welding current voltage from welding torch 38, connected to welding current source 38a, through connector 140a. When the welding current voltage decreases to below the level set by voltage divider 142, made up of resistances 143–145, because of the discharge of a droplet of weld metal from the tip of electrode 41, the output of voltage comparator 141 changes state from 0 volts to 5 volts. After another droplet of weld metal is discharged, the output of the voltage comparator again returns to 0. The series of voltage pulses from comparator 141 are delivered through conductor 147 to counter 148, and counted. When counter 148 reaches a count of 10, an output pulse goes to flip flops A and B of element 150, a 7476 switch. The flip flops change state, and flip flop A turns transistor 151 "on" and turns transistor 152 "off". The next pulse to the flip flop A of element 150 will turn transistor 151 "off" and turn transistor 152 "on". Transistors 151, 152 send current to electromagnet coils 75, 76, respectively. For turning transistors 151, 152 "on" and "off" for pulse counts other than 10, selector 155 and thumbwheel switches 156, 157 are used with flip flop B of element 150. Element 150 is shown in two parts connected by dashed line 160 in FIG. 9. The count value or setting of thumbwheel 156 is entered into the counter 148 upon initialization by element 162, element 162 being a one-shot monostable multivibrator. Pulses are then counted by counter 148 until a count of ten is reached. A pulse is sent to flip flop B of element 150, which changes state and causes the value of thumbwheel 157 to be entered into counter 148. Therefore, the number of welding current pulses and the same number of weld metal droplets discharged between changes of the on-off positions of transistors 151, 152 is controlled by the settings of thumbwheel switches 156, 157. In this way, the electrode 41 may be controlled to discharge a predetermined number of weld metal droplets at each side of the gap during the making of a weld in the manner heretofore described. By altering the settings of one or both of thumbwheel switches 156, 157, the droplet discharges at the opposite sides of the weld may be altered at any time during welding.

Amplifier 147a is connected into conductor 147, as shown. Logic gates 163–166 are provided, as shown. Switches 167, 168 control conductors 169, 170 respectively, leading to a control unit, not shown. The "X" connections shown in the drawing are connected to a +5 volts DC source. Oscillator 173, connected as shown, is used to check the amplitude of the welding torch oscillations when welding is not being done. Flyback diodes 175, 176 are included in the circuits of coils 75, 76, respectively.

In an example of use of the method according to the invention, two sections of thirty inch (outside diameter) seamless steel pipe were welded together end to end. The pipe ends were finished with facing stepped bevels similar to those shown in the drawings, but of narrower width. The gap at the inside was uniformly one-sixteenth inch. The gap at the outside was about five-sixteenths inch. A root pass was formed which was about one-eighth inch in thickness, after which the gap was filled with a filler pass to within about one-eighth inch of the outside of the gap. A cap or finish pass completed the weld, forming a slight hump outside of the outer pipe surfaces. At the inside of the root pass, a smooth hump approximately one-thirty secondth inch in thickness and having a width of about three-eights inch was formed, which did not require a grinding or finishing in any manner to be suitable for use.

For the root pass, five droplets of weld metal were deposited at each side of the gap for each oscillation of the electrode, the same being used for the filler pass. Adjustments of thumbwheel switches 156, 157 to provide five counts per oscillation were made, so that five metal droplets were discharged at each side of the weld prior to operation of flip flop B of element 150 to move the tip to the other side. The cap pass was formed with three droplets of weld metal deposited at each side of the center of the weld for each oscillation of the electrode. For all passes, five-thirty-secondths inch diameter steel welding wire was employed, the wire being bare but shielded by a stream of argoncarbon dioxide shielding gas during welding. The welding current was delivered at 125 volts for all passes, the pulse frequency being twenty-four pulses per second. The weld waas completely satisfactory in every respect, and was sectioned for inspection which revealed no bubbles or irregularities at several locations around the weld.

The process has been operated with pulse frequencies from ten pulses per second up to fifty pulses per second, with uniformly good results. While these are considered the optimum frequencies, frequencies from 5-6 per second to 80-100 per second are believed usable.

According to the invention as described, welds may be made which are completely satisfactory and uniform. Weld metal may be deposited along parallel paths at opposite sides of the gap with a selected numbers of droplets being deposited at each side before the welding electrode moves to the opposite side for deposition of weld metal droplets at the opposite side. Because of the absence of blow through of weld metal and formation of weld irregularities during the formation of the root weld or pass, finishing operations at the back side of the weld are unnecessary and their cost can be saved. A given weld may be made in any number of weld passes, as is known in the art. A complete weld may consist of only a single welding pass, or a complete weld may consist of a suitable number of overlaid passes. The invention affords methods and apparatuses which will greatly contribute to the quality of welds and result in economic benefits.

While preferred embodiments of the methods and apparatuses according to the invention have been described and shown in the drawings, many modifications thereof may be made by a person skilled in the art without departing from the spirit of the invention, and it is intended to protect by Letters Patent all forms of the invention falling within the scope of the following claims.

We claim:

1. Welding apparatus, comprising a welding torch having a consummable welding electrode, a pivotal support for said welding torch, electromagnetic means for oscillating said pivotal support and said welding torch supported thereby in back and forth movements, means for supplying DC welding current of pulsating amplitude to said welding electrode, said pulsating amplitude of said welding current having a frequency equal to the frequency of emissions of weld metal droplets from said welding electrode, electrical circuit means for energizing said electromagnetic means in correlation with the welding current amplitude pulse frequency so that a selected number of weld metal droplets are emitted at each of the ends of said back and forth movements of said welding torch, whereby a selected number of weld metal droplets are emitted along a pair of parallel paths along opposite sides of a welding joint, and whereby no weld metal droplets are emitted between said parallel paths.

2. The combination of claim 1, said pivotal support for said welding torch including a pivotally supported shaft having plate means of magnetizable material extending laterally therefrom, said electromagnetic means comprising a pair of electromagnets disposed one at each side of said plate means, said electric circuit means alternately energizing said electromagnets to cause said oscillations of said welding torch.

3. The combination of claim 2, including oppositely facing stop means for engaging said plate means to control the amplitude of said welding torch oscillations.

4. The combination of claim 3, including means for adjusting the spacing between said stop means to adjust the amplitude of said welding torch oscillations.

5. The combination of claim 4, said means for adjusting the spacing between said stop means comprising screw means having oppositely formed threads at different portions of its length each engaged with one of said stop means, whereby rotation of said screw means in one direction moves said stop means closer together and rotation of said screw means in the opposite direction moves said stop means farther apart.

6. The combination of claim 4, said electric circuit means comprising a pulse counter connected to receive said welding current, and switch means operated by said pulse counter for energizing said electromagnetic means in response to voltage pulses of said welding current.

7. The combination of claim 6, including adjustable selector means to alter the number of pulses counted by said pulse counter before said switch means is caused to operate by said pulse counter.

8. The combination of claim 7, said selector means being operated by a pair of adjustment switches each determining the number of pulses counted at the end of one direction of back and forth oscillatory movement of said welding torch, whereby the number of droplets of weld metal emitted at the ends of said back and forth movements of said welding torch in each direction are separately controlled.

9. The combination of claim 8, each of said adjustment switches being a thumbwheel switch.

10. The combination of claim 9, said switch means comprising flip flop switch means which actuate a pair of transistors which control current flow through said electromagnets.

11. Welding apparatus, comprising a welding torch having a consummable welding electrode, a pivotal support for said welding torch, electromagnetic means for oscillating said pivotal support and said welding torch supported thereby in back and forth movements, means for supplying DC welding current of pulsating amplitude to said welding electrode, said pulsating amplitude of said welding current having a frequency equal to the frequency of emissions of weld metal droplets from said welding electrode, electrical circuit means for energizing said electromagnetic means in correlation with the welding current amplitude pulse frequency so that a selected number of weld metal droplets are emitted at each of the ends of said back and forth movements of said welding torch, whereby a selected number of weld metal droplets are emitted along a pair of parallel paths along opposite sides of a welding joint, and whereby no weld metal droplets are emitted between said parallel paths, said electric circuit means comprising a pulse counter connected to receive said welding current, and switch means operated by said pulse counter for energizing said electromagnetic means in response to voltage pulses of said welding current.

12. The combination of claim 11, including adjustable selector means to alter the number of pulses counted by said pulse counter before said switch means is caused to operate by said pulse counter.

13. The combination of claim 12, said selector means being operated by a pair of adjustment switches each determining the number of pulses counted at the end of one direction of back and forth oscillatory movement of said welding torch, whereby the number of droplets of weld metal emitted at the ends of said back and forth movements of said welding torch in each direction are separately controlled.

14. The combination of claim 13, each of said adjustment switches being a thumbwheel switch.

15. The combination of claim 14, said electric circuit means including said electromagnetic means, said electromagnetic means comprising a pair of electromagnets which are alternately energized by said switch means in response to operation of said pulse counter.

16. The combination of claim 15, said switch means comprising flip flop switch means which actuate a pair of transistors which control current flow through said electromagnets.

17. The combination of claims 1, 2, 3, 4, 5, or 11, including means for moving said welding torch longitunally of said welding joint.

18. The combination of claims 1, 2, 3, 4, 5, or 11, including means for feeding said consummable electrode through said welding torch.

19. Welding apparatus, comprising a welding torch having a consummable welding electrode, a pivotal support for said welding torch, electromagnetic means for oscillating said pivotal support and said welding torch supported thereby in back and forth movements, means for supplying DC welding current of pulsating amplitude to said welding electrode, said pulsating amplitude of said welding current having a frequency equal to the frequency of emissions of weld metal droplets from said welding electrode, electrical circuit means for energizing said electromagnetic means in correlation with the welding current amplitude pulse frequency so that a selected number of weld metal droplets are emitted at each of the ends of said back and forth movements of said welding torch, whereby a selected number of weld metal droplets are emitted along a pair of parallel paths along opposite sides of a welding joint, and whereby no weld metal droplets are emitted between said parallel paths, said electric circuit means comprising a pulse counter connected to receive said welding current, and switch means operated by said pulse counter for energizing said electromagnetic means in response to voltage pulses of said welding current.

20. The combination of claim 19, including adjustable selector means to alter the number of pulses counted by said pulse counter before said switch means is caused to operate by said pulse counter.

21. The combination of claim 20, said selector means being operated by a pair of adjustment switches each determining the number of pulses counted at the end of one direction of back and forth oscillatory movement of said welding torch, whereby the number of droplets of weld metal emitted at the ends of said back and forth movements of said welding torch in each direction are separately controlled.

22. The combination of claim 21, each of said adjustment switches being a thumbwheel switch.

23. The combination of claim 22, said electric circuit means including said electromagnetic means, said electromagnetic means comprising a pair of electromagnets which are alternately energized by said switch means in response to operation of said pulse counter.

24. The combination of claim 23, said switch means comprising flip flop switch means which actuate a pair of transistors which control current flow through said electromagnets.

25. Welding apparatus, comprising a welding torch having a consummable welding electrode, a pivotal support for said welding torch, electromagnetic means for oscillating said pivotal support and said welding torch supported thereby in back and forth movements, means for supplying DC welding current of pulsating amplitude to said welding electrode, said pulsating amplitude of said welding current having a frequency equal to the frequency of emissions of weld metal droplets from said welding electrode, electrical circuit means for energizing said electromagnetic means in correlation with the welding current amplitude pulse frequency so that a selected number of weld metal droplets are emitted at each of the ends of said back and forth movements of said welding torch, whereby a selected number of weld metal droplets are emitted along a pair of parallel paths along opposite sides of a welding joint, and whereby no weld metal droplets are emitted between said parallel paths, said pivotal support for said welding torch including a pivotally supported shaft having plate means of magnetizable material extending laterally therefrom, said electromagnetic means comprising a pair of electromagnets disposed one at each side of said plate means, said electric circuit means alternately energizing said electromagnets to cause said oscillations of said welding torch, said electric circuit means comprising a pulse counter connected to receive said welding current, and switch means operated by said pulse counter for energizing said electromagnetic means in response to voltage pulses of said welding current.

26. The combination of claim 25, including adjustable selector means to alter the number of pulses counted by said pulse counter before said switch means is caused to operate by said pulse counter.

27. The combination of claim 26, said selector means being operated by a pair of adjustment switches each determining the number of pulses counted at the end of one direction of back and forth oscillatory movement of said welding torch, whereby the number of droplets of weld metal emitted at the ends of said back and forth movements of said welding torch in each direction are separately controlled.

28. The combination of claim 27, each of said adjustment switches being a thumbwheel switch.

29. The combination of claim 28, said switch means comprising flip flop switch means which actuate a pair of transistors which control current flow through said electromagnets.

30. Welding apparatus, comprising a welding torch having a consummable welding electrode, a pivotal support for said welding torch, electromagnetic means for oscillating said pivotal support and said welding torch supported thereby in back and forth movements, means for supplying DC welding current of pulsating amplitude to said welding electrode, said pulsating amplitude of said welding current having a frequency equal to the frequency of emissions of weld metal droplets from said welding electrode, electrical circuit means for energizing said electromagnetic means in correlation with the welding current amplitude pulse frequency so that a selected number of weld metal droplets are emitted at each of the ends of said back and forth movements of said welding torch, whereby a selected number of weld metal droplets are emitted along a pair of parallel paths along opposite sides of a welding joint, and whereby no weld metal droplets are emitted between said parallel paths, said pivotal support for said welding torch including a pivotally supported shaft having plate means of magnetizable material extending laterally therefrom, said electromagnetic means comprising a pair of electromagnets disposed one at each side of said plate means, said electric circuit means alternately energizing said electromagnets to cause said oscillations of said welding torch, including oppositely facing stop means for engaging said plate means to control the amplitude of said welding torch oscillations, said electric circuit means comprising a pulse counter connected to receive said welding current, and switch means operated by said pulse counter for energizing said electromagnetic means in response to voltage pulses of said welding current.

31. The combination of claim 30, including adjustable selector means to alter the number of pulses counted by said pulse counter before said switch means is caused to operate by said pulse counter.

32. The combination of claim 31, said selector means being operated by a pair of adjustment switches each determining the number of pulses counted at the end of one direction of back and forth oscillatory movement of said welding torch, whereby the number of droplets of weld metal emitted at the ends of said back and forth movements of said welding torch in each direction are separately controlled.

33. The combination of claim 32, each of said adjustment switches being a thumbwheel.

34. The combination of claim 33, said switch means comprising flip flop switch means which actuate a pair of transistors which control current flow through said electromagnets.

* * * * *